US012531664B2

(12) United States Patent
Li et al.

(10) Patent No.: US 12,531,664 B2
(45) Date of Patent: Jan. 20, 2026

(54) DATA TRANSMISSION METHOD AND COMMUNICATION APPARATUS

(71) Applicant: HUAWEI TECHNOLOGIES CO., LTD., Shenzhen (CN)

(72) Inventors: Miao Li, Wuhan (CN); Weimin Wu, Wuhan (CN); Zhao Shen, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 388 days.

(21) Appl. No.: 18/353,554

(22) Filed: Jul. 17, 2023

(65) Prior Publication Data

US 2023/0361936 A1    Nov. 9, 2023

Related U.S. Application Data

(63) Continuation of application No. PCT/CN2021/125153, filed on Oct. 21, 2021.

(30) Foreign Application Priority Data

Jan. 18, 2021   (CN) .......................... 202110062655.1

(51) Int. Cl.
*H04W 72/23* (2023.01)
*H04L 1/1829* (2023.01)
*H04W 28/04* (2009.01)
*H04W 72/12* (2023.01)

(52) U.S. Cl.
CPC ........... *H04L 1/1829* (2013.01); *H04W 28/04* (2013.01); *H04W 72/12* (2013.01); *H04W 72/23* (2023.01)

(58) Field of Classification Search
CPC .................................................. H04W 72/23

USPC ........................................................ 370/329
See application file for complete search history.

(56) References Cited

U.S. PATENT DOCUMENTS

2020/0014576 A1    1/2020  Cherian et al.
2020/0196348 A1    6/2020  Fan et al.

FOREIGN PATENT DOCUMENTS

WO         2020226827 A1    11/2020

OTHER PUBLICATIONS

Extended European Search Report issued in corresponding European Application No. 21918973.5, dated Oct. 30, 2023, pp. 1-11.
IEEE P802.11ax/D8.0, Draft Standard for Information technology, Telecommunications and information exchange between systems Local and metropolitan area networks, Specific requirements, Part 11: Wireless LAN Medium Access Control (MAC) and Physical Layer (PHY) Specifications, Amendment 1: Enhancements for High Efficiency WLAN, IEEE P802.11ax/D8.0, Oct. 2020, (amendment to IEEE P802.11REVmd/D5.0), total 820 pages.

*Primary Examiner* — Angel T Brockman
(74) *Attorney, Agent, or Firm* — HAUPTMAN HAM, LLP

(57) ABSTRACT

A data transmission method and a communication apparatus to improve transmission timeliness. In a wireless local area network, one channel transmission opportunity is obtained by an access point AP through contention. The AP sends service data to a station STA, and the STA feeds back a first data frame in which an error occurs in the service data to the AP. The AP sends scheduling information on a downlink channel to notify the STA of a retransmission resource unit used for retransmission of the first data frame, and retransmits the first data frame on the retransmission resource unit. Correspondingly, the STA receives the first data frame on the retransmission resource unit.

14 Claims, 5 Drawing Sheets

DATA TRANSMISSION METHOD AND COMMUNICATION APPARATUS

CROSS-REFERENCE TO RELATED APPLICATIONS

This application is a continuation of International Application No. PCT/CN2021/125153, filed on Oct. 21, 2021, which claims priority to Chinese Patent Application No. 202110062655.1, filed on Jan. 18, 2021. The disclosures of the aforementioned applications are hereby incorporated by reference in their entireties.

BACKGROUND

A wireless local area network (wireless local area network, WLAN) is a system that uses a wireless technology to transmit data. Emergence of this technology makes up for a shortage of a wired local area network, so as to achieve network extension. With evolution of the 802.11 protocol and development of the WLAN, frequency band resources that is able to be used now are greatly improved compared with those used in response to the WLAN emerging. More detailed scheduling is performed on the frequency band resources, thereby improving resource utilization and improving channel transmission quality. In the 802.11ax, an orthogonal frequency-division multiple access (orthogonal frequency-division multiple access, OFDMA) technology is introduced, and a smallest subchannel is referred as to a "resource unit" (resource unit, RU) by imitating a long term evolution (long term evolution, LTE) proper noun.

Communication between an access point (access point, AP) and a station (station, STA) obtains a transmission opportunity of specific duration through contention, and then the AP performs RU allocation on the transmission opportunity by using a trigger (trigger) frame, a preamble (preamble), or an MU-RTS frame, so as to send data to the STA by using an allocated RU.

However, in response to a transmission error occurring in service data, the AP is to retransmit, to the STA at a next transmission opportunity, the service data in which the error occurs. Therefore, transmission timeliness is insufficient.

SUMMARY

Embodiments described herein provide a data transmission method and a communication apparatus, to improve transmission timeliness.

A first aspect of at least one embodiment provides a data transmission method. The method includes: In one channel transmission opportunity, an access point AP sends service data to a station STA, where the service data includes a first data frame; the AP receives first feedback information sent by the STA, where the first feedback information indicates to retransmit the first data frame; the AP sends scheduling information to the STA, where the scheduling information indicates a resource unit in which the retransmitted first data frame is located; and the AP sends the first data frame to the STA on the retransmission resource unit.

In the first aspect, the AP obtains the channel transmission opportunity through contention, and transmits the service data with the STA in the channel transmission opportunity. In response to the STA detecting the first data frame in which a transmission error occurs in the service data, the STA sends the first feedback information to the AP. The first feedback information indicates that the AP is to retransmit the first data frame. Correspondingly, after receiving the first feedback information, the AP sends the scheduling information to the STA, to notify the STA of retransmitting the first data frame on a specific resource unit, for example, to retransmit the first data frame on the retransmission resource unit. Then, the STA receives the retransmitted first data frame on the retransmission resource unit. In this way, incorrect data is retransmitted in one transmission opportunity, thereby improving data transmission timeliness.

In a possible implementation, the step that an AP sends service data to a STA includes: The AP sends the service data to the STA in a first scheduling period, where the channel transmission opportunity includes a plurality of scheduling periods, and the plurality of scheduling periods include the first scheduling period. The step that the AP receives first feedback information sent by the STA includes: The AP receives, in a second scheduling period, the first feedback information sent by the STA, where the plurality of scheduling periods include the second scheduling period, and the second scheduling period is a scheduling period after the first scheduling period. The step that the AP sends scheduling information to the STA includes: The AP sends the scheduling information to the STA in a third scheduling period, where the plurality of scheduling periods include the third scheduling period, and the third scheduling period is a scheduling period after the second scheduling period. The step that the AP sends the first data frame to the STA on the retransmission resource unit includes: The AP sends the first data frame to the STA on the retransmission resource unit and in a fourth scheduling period, where the plurality of scheduling periods include the fourth scheduling period, and the fourth scheduling period is the third scheduling period or a scheduling period after the third scheduling period.

In this possible implementation, the transmission opportunity includes the plurality of scheduling periods, and the step of sending the service data, the step of receiving the first feedback information, the step of sending the scheduling information, and the step of sending the first data frame that are performed by the AP is performed in consecutive scheduling periods. Alternatively, the steps is performed in discontinuous scheduling periods. Optionally, the step of sending the first data frame and the step of sending the scheduling information is performed in a same scheduling period. In this way, feasibility of the solution is improved.

In a possible implementation, the step that the AP sends scheduling information to the STA includes: The AP sends the scheduling information to the STA on a fixed resource. The scheduling information includes a first special identifier, and the first special identifier indicates that the fixed resource is a preset fixed resource unit for transmitting the scheduling information.

In this possible implementation, a fixed resource is allocated to a preamble (preamble) field sent by the AP after the AP obtains the transmission opportunity through contention. The fixed resource is indicated by a first special identifier indicating that the fixed resource is a resource unit dedicated to transmitting scheduling information. This improves feasibility of the solution.

In a possible implementation, the retransmission resource unit is included in a first dynamic scheduling resource on a downlink channel, the scheduling information includes a second special identifier, and the second special identifier indicates that the first dynamic scheduling resource is a preset resource unit for adjusting resource allocation.

In a possible implementation, the retransmission resource unit is used to carry a virtual reality VR retransmission service, and the first dynamic scheduling resource is used to carry feedback information of the VR retransmission service, a non-VR downlink service, and a non-VR uplink service. The VR retransmission service takes precedence over the non-VR downlink service and the non-VR uplink service in terms of transmission of the feedback information.

In a possible implementation, the feedback information is carried on a second dynamic scheduling resource on an uplink channel, the second dynamic scheduling resource is used for dynamic scheduling of uplink transmission of a non-virtual-reality VR service and downlink feedback of the non-VR service, and dynamic scheduling of the second dynamic scheduling resource is controlled based on the scheduling information.

In a possible implementation, the step that the AP sends the scheduling information to the STA in a third scheduling period includes: The AP sends the scheduling information to the STA for a plurality of times in the third scheduling period.

In this possible implementation, in response to the AP sending the scheduling information to the STA, a sending error occurs. As a result, the STA cannot receive the scheduling information. The AP sends the scheduling information to the STA for a plurality of times in the third scheduling period, to improve reliability of receiving the scheduling information by the STA.

In a possible implementation, the method further includes: The AP receives an uplink service sent by the STA, where the uplink service includes a second data frame; and the AP sends second feedback information to the STA, where the second feedback information indicates the STA to retransmit the second data frame.

In this possible implementation, in the transmission opportunity, the AP further receives the uplink service sent by the STA, and feed back the second feedback information to the STA in response to the second data frame in which a transmission error occurs in the uplink service, so that the STA retransmits the second data frame, to improve data transmission timeliness.

A second aspect of at least one embodiment provides a data transmission method. The method includes: In one channel transmission opportunity, a station STA receives service data sent by an access point AP, where the service data includes a first data frame; the STA sends first feedback information to the AP, where the first feedback information indicates the AP to retransmit the first data frame; the STA receives scheduling information sent by the AP, where the scheduling information indicates a retransmission resource unit in which the retransmitted first data frame is located; and the STA receives the first data frame on the retransmission resource unit.

In a possible implementation, the step that a STA receives service data sent by an AP includes: The STA receives, in a first scheduling period, the service data sent by the AP, where the channel transmission opportunity includes a plurality of scheduling periods, and the plurality of scheduling periods include the first scheduling period. The step that the STA sends first feedback information to the AP includes: The STA sends the first feedback information to the AP in a second scheduling period, where the plurality of scheduling periods include the second scheduling period, and the second scheduling period is a scheduling period after the first scheduling period. The step that the STA receives scheduling information sent by the AP includes: The STA receives, in a third scheduling period, the scheduling information sent by the AP, where the plurality of scheduling periods include the third scheduling period, and the third scheduling period is a scheduling period after the second scheduling period. The step that the STA receives the first data frame on the retransmission resource unit includes: The STA receives the first data frame on the retransmission resource unit and in a fourth scheduling period, where the plurality of scheduling periods include the fourth scheduling period, and the fourth scheduling period is the third scheduling period or a scheduling period after the third scheduling period.

In a possible implementation, the step that the STA receives scheduling information sent by the AP includes: The STA receives, on a fixed resource, the scheduling information sent by the AP. The scheduling information includes a first special identifier, and the first special identifier indicates that the fixed resource is a preset fixed resource unit for transmitting the scheduling information.

In a possible implementation, the retransmission resource unit is included in a first dynamic scheduling resource on a downlink channel, the scheduling information includes a second special identifier, and the second special identifier indicates that the first dynamic scheduling resource is a preset resource unit for adjusting resource allocation.

In a possible implementation, the retransmission resource unit is used to carry a virtual reality VR retransmission service, and the first dynamic scheduling resource is used to carry feedback information of the VR retransmission service, a non-VR downlink service, and a non-VR uplink service. The VR retransmission service takes precedence over the non-VR downlink service and the non-VR uplink service in terms of transmission of the feedback information.

In a possible implementation, the feedback information is carried on a second dynamic scheduling resource on an uplink channel, the second dynamic scheduling resource is used for dynamic scheduling of uplink transmission of a non-virtual-reality VR service and downlink feedback of the non-VR service, and dynamic scheduling of the second dynamic scheduling resource is controlled based on the scheduling information.

In a possible implementation, the method further includes: The STA sends an uplink service to the AP, where the uplink service includes a second data frame; and the STA receives second feedback information sent by the AP, where the second feedback information indicates to retransmit the second data frame.

A third aspect of at least one embodiment provides a communication apparatus. The communication apparatus includes a transceiver unit, configured to: in one channel transmission opportunity, send service data to a station STA, where the service data includes a first data frame; receive first feedback information sent by the STA, where the first feedback information indicates to retransmit the first data frame; send scheduling information to the STA, where the scheduling information indicates a retransmission resource unit in which the retransmitted first data frame is located; and send the first data frame to the STA on the retransmission resource unit; and a processing unit, configured to generate the scheduling information.

The communication apparatus is configured to perform the method in any one of the first aspect or the implementations of the first aspect.

A fourth aspect of at least one embodiment provides a communication apparatus. The communication apparatus includes a transceiver unit, configured to: in one channel transmission opportunity, receive service data sent by an access point AP, where the service data includes a first data frame; send first feedback information to the AP, where the feedback information indicates the AP to retransmit the first data frame; receive scheduling information sent by the AP, where the scheduling information indicates a retransmission resource unit in which the retransmitted first data frame is located; and receive the first data frame on the retransmission resource unit; and a processing unit, configured to determine the feedback information.

The communication apparatus is configured to perform the method in any one of the second aspect or the implementations of the second aspect.

A fifth aspect of at least one embodiment provides a computer device, including a processor, a memory, and a communication interface. The processor is configured to execute instructions stored in the memory, to enable the computer device to perform the method provided in any one of the first aspect or the optional manners of the first aspect. The communication interface is configured to receive or send an indication. For specific details of the computer device provided in the fifth aspect, refer to any one of the first aspect or the optional manners of the first aspect. Details are not described herein again.

A sixth aspect of at least one embodiment provides a computer device, including a processor, a memory, and a communication interface. The processor is configured to execute instructions stored in the memory, to enable the computer device to perform the method provided in any one of the second aspect or the optional manners of the second aspect. The communication interface is configured to receive or send an indication. For specific details of the computer device provided in the sixth aspect, refer to any one of the second aspect or the optional manners of the second aspect. Details are not described herein again.

A seventh aspect of at least one embodiment provides a computer-readable storage medium. The computer-readable storage medium stores a program. In response to a computer executing the program, the method provided in any one of the first aspect or the optional manners of the first aspect is performed.

An eighth aspect of at least one embodiment provides a computer-readable storage medium. The computer-readable storage medium stores a program. In response to a computer executing the program, the method provided in any one of the second aspect or the optional manners of the second aspect is performed.

A ninth aspect of at least one embodiment provides a computer program product. In response to the computer program product being executed on a computer, the computer performs the method provided in any one of the first aspect or the optional manners of the first aspect.

A tenth aspect of at least one embodiment provides a computer program product. In response to the computer program product being executed on a computer, the computer performs the method provided in any one of the second aspect or the optional manners of the second aspect.

DESCRIPTION OF EMBODIMENTS

Embodiments described herein provide a data transmission method and a communication apparatus, to improve transmission timeliness.

The following describes embodiments herein with reference to accompanying drawings. The described embodiments are merely some but not all of embodiments described herein. A person of ordinary skill in the art is able to learn that, with technology development and emergence of a new scenario, technical solutions provided in at least one embodiment are also applicable to a similar technical problem.

In at least one embodiment, claims, and accompanying drawings, the terms "first", "second", and so on are intended to distinguish between similar objects but do not necessarily indicate a specific order or sequence. The data used in such a way is interchangeable in proper circumstances, so that embodiments described herein is implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but includes other steps or units not expressly listed or inherent to such a process, method, product, or device.

The specific term "example" herein means "used as an example, embodiment or illustration". Any embodiment described as "example" is not necessarily explained as being superior or better than other embodiments.

In addition, to better describe embodiments herein, numerous specific details are given in the following specific implementations. A person of ordinary skill in the art should understand that the present disclosure is also implemented without the specific details. In some examples, methods, means, components, and circuits well known by a person skilled in the art are not described in detail, so that a main purpose of the present disclosure is highlighted.

Figure 1:
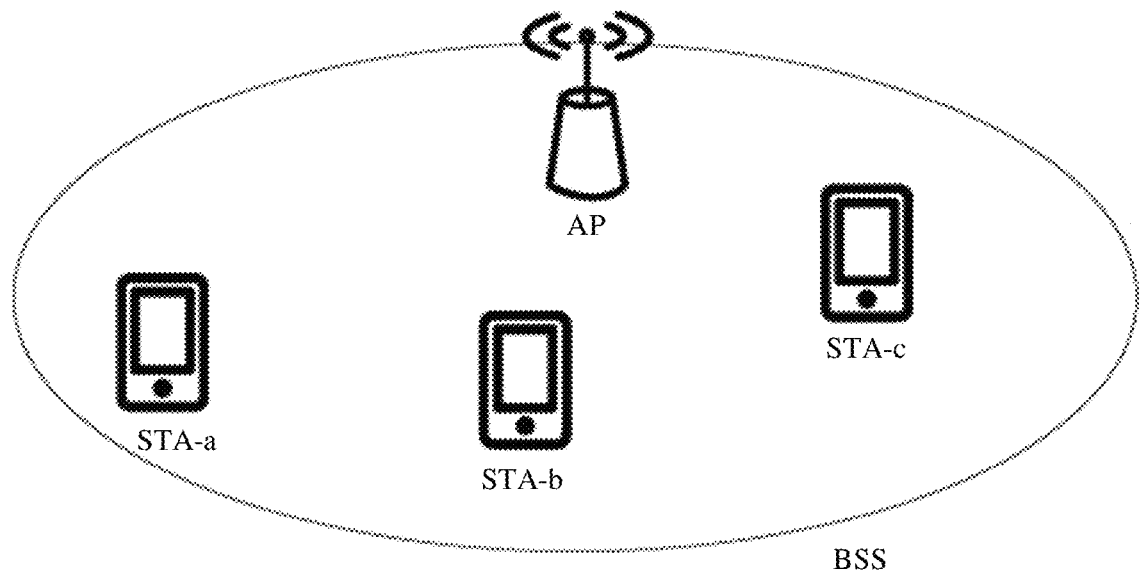
FIG. 1 is a schematic diagram of a basic service set in a wireless local area network according to at least one embodiment.

Refer to a schematic diagram of a basic service set in a wireless local area network shown in FIG. 1. One WLAN device is an access point (access point, AP), and the rest are stations (stations, STAs). The AP is a management device of the basic service set (basic service set, BSS) in the WLAN, and has a management function, for example, sends a beacon (Beacon) broadcast frame. The STAs are associated with the AP, and transmit a service by using the AP to communicate with another device. For example, one AP is associated with one or more STAs. In this embodiment, three STAs are used as an example. As shown in FIG. 1, the AP is associated with the three STAs: a STA-a, a STA-b, and a STA-c.

The access point is a device that connects a station to a communication network in a communication system. For example, the access point is referred to as a radio access network (radio access network, RAN) node (or device), a base station, or the like. Currently, some examples of the access point are: a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, home evolved NodeB, or home NodeB, HNB), a baseband unit (baseband unit, BBU), a Wi-Fi access point, and another interface device that works in a wireless environment.

The station is a device that has a wireless connection function and that provides voice and/or data connectivity for a user, and is also referred to as a terminal device, user equipment (user equipment, UE), a mobile station (mobile station, MS), a mobile terminal (mobile terminal, MT), or the like. Currently, some examples of the station include: a mobile phone (mobile phone), a tablet computer, a notebook computer, a handheld computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), and a vehicle-mounted device.

The wireless local area network (wireless local area network, WLAN) is a system that uses a wireless technology to transmit data. Emergence of this technology makes up for a shortage of a wired local area network, so as to achieve network extension.

With evolution of the 802.11 protocol and development of the WLAN, frequency band resources that is used now are greatly improved compared with those used in response to the WLAN emerging. More detailed scheduling is performed on the frequency band resources, thereby improving resource utilization and improving channel transmission quality.

The 802.11ax, also referred to as high-efficiency wireless (high-efficiency wireless, HEW), is a latest Wi-Fi standard put into commercial use. A series of features and a plurality of mechanisms are proposed to increase a user capacity and improve a working mode of a Wi-Fi network, thereby obtaining better user experience. One of them is orthogonal frequency-division multiple access (orthogonal frequency-division multiple access, OFDMA). Multiple access is added in an orthogonal frequency-division multiplexing (orthogonal frequency-division multiplexing, OFDM) system by allocating subcarrier sets to different users, so that a plurality of users simultaneously access different subchannels of a same channel. The OFDMA system implements wireless technologies such as evolved universal terrestrial radio access (evolved universal terrestrial radio access, E-UTRA), ultra mobile broadband (ultra mobile broadband, UMB), the IEEE 802.11 (Wi-Fi), the IEEE 802.16 (WiMAX), the IEEE 802.20, and Flash OFDMA. UTRA and the E-UTRA correspond to UMTS and an evolved version of the UMTS. Various versions of the 3GPP in long term evolution (long term evolution, LTE) and LTE-based evolution are new versions of the universal mobile telecommunications system (universal mobile telecommunications system, UMTS) using the E-UTRA. A 5th generation (5 Generation, "5G" for short) communication system or a new radio (New Radio, "NR" for short) system is a next generation communication system under study.

Figure 2:
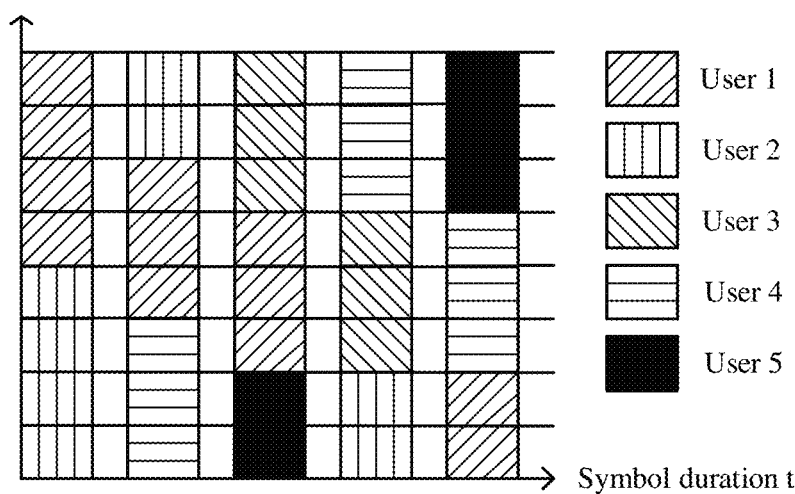
FIG. 2 is a schematic diagram of an OFDMA working mode according to at least one embodiment.

A device in the WLAN is able to obtain a right to use a channel resource through contention, in other words, becomes a transmission opportunity (transmission opportunity, TXOP) holder. Currently, the AP and the STA have an equal chance to compete. To be specific, after a node succeeds in contention, the node obtains a time period to use a channel, in other words, obtains one channel transmission opportunity. In the time period, the node transmits a plurality of data frames. In the 802.11ax to which the OFDMA technology is introduced, the AP performs uplink and downlink transmission and scheduling for different STAs on different time-frequency resources, so as to improve system resource utilization. In an OFDMA working mode shown in FIG. 2, a channel bandwidth f is used as a vertical coordinate, and a symbol duration t is used as a horizontal coordinate. The OFDMA divides a channel into many subchannels, and the subchannels are allocated to different users for use, allowing a plurality of users (for example, a user 1 represented by left slashes, a user 2 represented by vertical lines, a user 3 represented by right slashes, a user 4 represented by horizontal lines, and a user 5 represented by black fill) to exist.

In addition, the communication system is further applicable to future-oriented communication technologies, and is applicable to all the technical solutions provided in at least one embodiment. The system architecture and the service scenario described in at least one embodiment are intended to describe the technical solutions in at least one embodiment more clearly, and do not constitute a limitation on the technical solutions provided in at least one embodiment. A person of ordinary skill in the art knows that: With the evolution of the network architecture and the emergence of new service scenarios, the technical solutions provided in at least one embodiment are also applicable to similar technical problems.

Based on the foregoing application scenario, the following describes the data transmission method provided in at least one embodiment.

In response to an AP transmitting downlink data and successfully obtains a channel through contention, the AP indicates, in an HE-SIG-B field of a preamble (Preamble) of a physical layer protocol data unit, RU division and RU scheduling allocation results. The HE-SIG-B field includes a common field (common field) and a user specific field (user specific field). The common field indicates RU resource allocation (subchannel division and a quantity of accessed STAs). The user specific field indicates a STA ID, a modulation and coding scheme (modulation and coding scheme, MCS) level, a coding scheme, and the like of a STA. During uplink hybrid access, the AP indicates RU division in a trigger frame. The trigger (Trigger) frame includes one common info (Common Info) field and a plurality of user info (User Info) fields. An association identifier (association identifier, AID) 12 field and an RU allocation (Allocation) field indicate channel RU resource allocation, and a STA that has been allocated an RU directly uploads data in the corresponding RU. A STA that has not been allocated an RU but has data to transmit sends uplink data on a random access RU (random access resource unit (random access resource unit, RARU)) in a random contention manner. Therefore, in the conventional technology, in response to service data transmission failing, RU allocation is to be performed after a next preamble or trigger frame is sent. As a result, transmission timeliness is insufficient. In addition, scheduling overheads for sending the trigger frame or the preamble are high, and consequently transmission efficiency is affected.

To resolve the foregoing problem, at least one embodiment provides a data transmission method. The method is described as follows:

In this embodiment, an AP is the foregoing access point.

Figure 3:
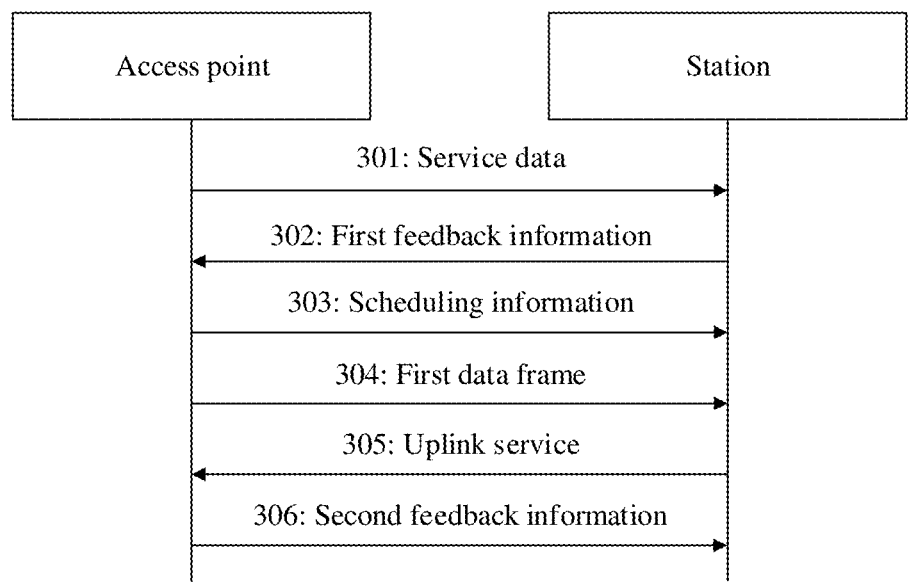
FIG. 3 is a schematic diagram of an embodiment of a data transmission method according to at least one embodiment.

Refer to FIG. 3. An embodiment of the data transmission method shown in FIG. 3 includes the following steps.

301: The AP sends service data to a STA in a first scheduling period.

In this embodiment, after obtaining a TXOP through contention, the AP performs uplink and downlink transmission and scheduling on different STAs on different time-frequency resources.

The AP periodically sends a preamble field on a downlink channel to perform RU resource allocation. In response to sending the preamble field on the downlink channel, the AP sends a trigger frame on an uplink channel. The AP reserves a fixed RU for each virtual reality (virtual reality, VR) STA for VR downlink service transmission, and the resource is identified by an AID of each STA. After receiving the preamble field, the STA first decodes the preamble field to obtain RU division and RU scheduling allocation results. Then, the STA receives downlink data on a corresponding RU.

That is, in this embodiment, the AP sends VR service data to the STA in the first scheduling period on the RU corresponding to an AID of the STA, and the STA receives the VR service data on the corresponding RU. The service data includes a first data frame, and the first data frame is any data frame in the service data.

One channel transmission opportunity obtained through contention after the AP obtains the TXOP includes a plurality of scheduling periods. One scheduling period is related to a subcarrier bandwidth. A scheduling period is 3.2 microseconds (μs) in the 802.11ac, and a scheduling period is 12.8 μs in the 802.11ax. The first scheduling period is one of the plurality of scheduling periods. The AP sends the service data to the STA in any scheduling period in the channel transmission opportunity. Specifically, a transmission period of the service data includes a plurality of scheduling periods.

302: In response to a transmission error occurring in the service data, the STA sends first feedback information to the AP in a second scheduling period.

In this embodiment, in response to the transmission error occurring in the service data, in other words, the STA cannot receive the first data frame, the STA feeds back the transmission error to the AP through the uplink channel, in other words, transmit the first feedback information, so that the AP retransmits the first data frame.

The STA feeds back the transmission error to the AP in the second scheduling period, and the second scheduling period is a scheduling period after the first scheduling period. That is, in response to the STA detects the transmission error of the service data, the STA feeds back the transmission error in a scheduling period after one or more scheduling periods followed by a scheduling period in which the service data in which the transmission error occurs is located.

Optionally, an RU used by the STA to feed back the transmission error on the uplink channel is allocated by the AP, and the AP performs RU resource allocation on the uplink channel by using the trigger frame. The STA sends the first feedback information on the allocated RU, and the AP receives the first feedback information on the RU. A fixed RU is reserved on the uplink channel for uplink sending of each VR service feedback of the STA, and the resource is identified by the AID of each STA. A remaining RU is a second dynamic scheduling resource, is used for secondary scheduling, and is used for dynamic scheduling of uplink transmission of a non-VR service and downlink feedback of the non-VR service. The resource is indicated by using a special AID (SID-S1). Specifically, the AP sends scheduling information on the downlink channel to indicate how to perform scheduling.

303: The AP sends the scheduling information to the STA based on the first feedback information in a third scheduling period by using a fixed resource.

In this embodiment, after receiving the first feedback information from the STA on the uplink channel, the AP sets the scheduling information based on the first feedback information, and send the scheduling information to the STA by using the fixed resource. Correspondingly, the STA receives the scheduling information by using the fixed resource.

The fixed resource is indicated by using a first special identifier AID-S1 in response to the AP sending the preamble field through the downlink channel. The first special identifier indicates that the fixed resource on the downlink channel is a reserved resource block that is fixedly used to transmit the scheduling information. In response to sending the preamble field through the downlink channel, the AP further indicates first dynamic scheduling resource by using a second special identifier AID-S2. The second special identifier identifies that the first dynamic scheduling resource is a preset resource block for adjusting RU allocation, for example, secondary scheduling of the RU.

The scheduling information indicates RU allocation in the first dynamic scheduling resource, for example, indicate by using a few symbols, and is sent in real time in response to allocation of the first dynamic scheduling resource changing. After receiving the first feedback information, the AP determines the service data that is to be retransmitted and an RU that performs retransmission, and then send the scheduling information to the STA in a scheduling period after one or more scheduling periods followed by the second scheduling period in which the first feedback information is received, to indicate the resource unit in which the to-be-retransmitted first data frame is located. The scheduling information is represented by a length of n symbols, and the scheduling information includes an RU type, an RU number, and an AID.

Optionally, the AP sends the scheduling information to the STA for a plurality of times in the third scheduling period, to improve reliability of data transmission.

304: The AP sends the first data frame to the STA on the retransmission resource unit and in a fourth scheduling period.

In this embodiment, after the AP sends the scheduling information to the STA in the third scheduling period, the STA learns of, in the third scheduling period based on the scheduling information, the RU on which the first data frame in which the transmission error occurs is transmitted. The AP sends, in the fourth scheduling period after one or more scheduling periods followed by the third scheduling period, the first data frame to the STA by using the retransmission resource unit indicated by the scheduling information.

Figure 4:
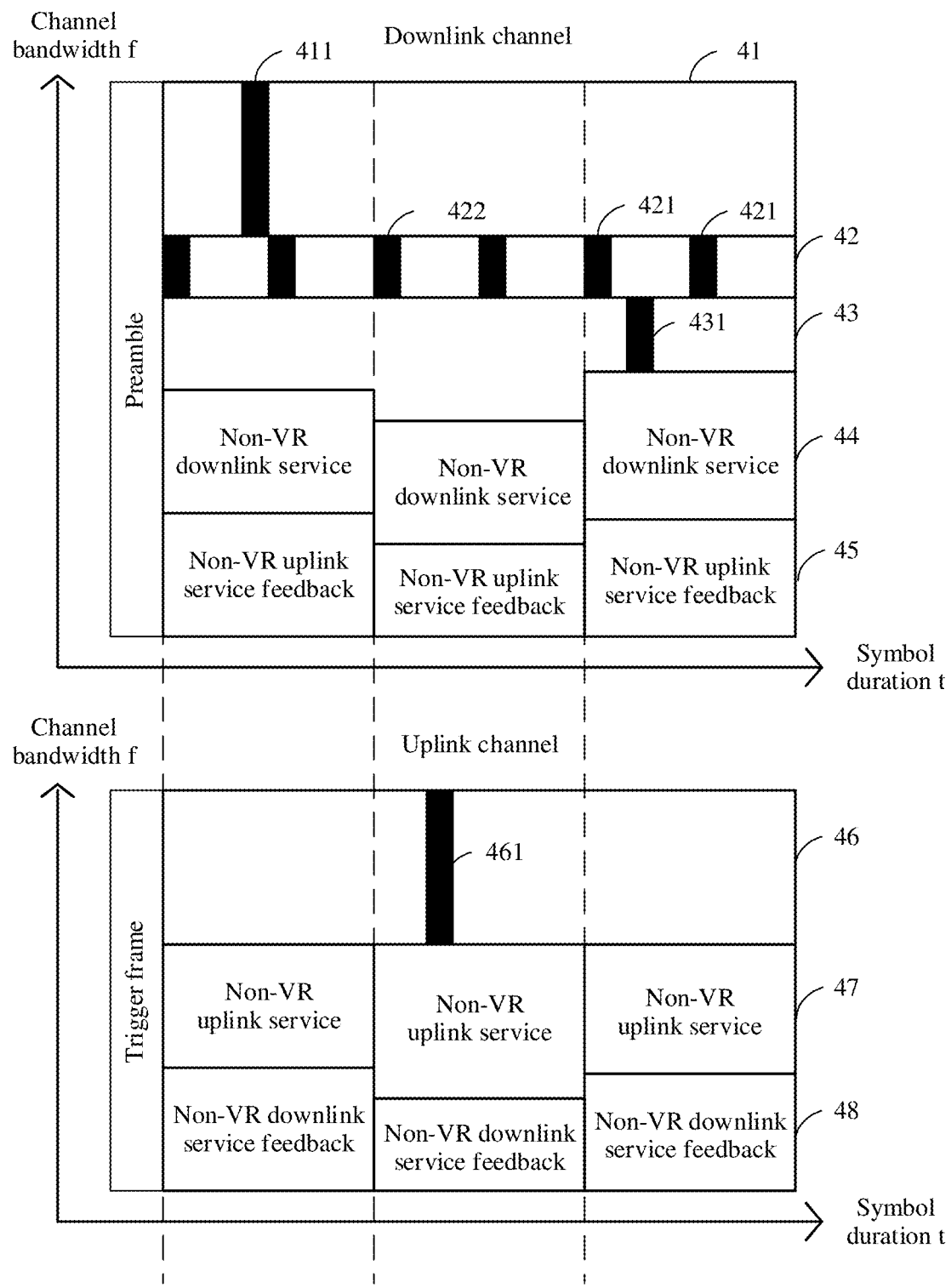
FIG. 4 is a schematic diagram of data transmission according to at least one embodiment.

For example, FIG. 4 is a schematic diagram of data transmission. FIG. 4 includes time-frequency schematic diagrams of the downlink channel and the uplink channel. Optionally, the downlink channel is a 5.8 G channel, and the uplink channel is a 5.2 G channel. After obtaining the channel transmission opportunity through contention, the AP sends the preamble on the downlink channel, and sends the trigger frame on the uplink channel. The preamble indicates that a time-frequency schematic diagram of the downlink channel includes a fixed RU 41 that is used for transmitting the VR downlink service and that is reserved by the AP, includes a reserved fixed resource 42 for transmitting the scheduling information, and further includes an RU 43 for retransmitting the first data frame, an RU 44 for transmitting a non-VR downlink service, and an RU 45 for feeding back a non-VR uplink service. The trigger frame indicates that a time-frequency schematic diagram of the uplink channel includes an RU 46 that is of a fixed resource size and that is used by the STA for uplink sending of VR service feedback, and further includes an RU 47 that is used for transmitting a non-VR uplink service, and an RU 48 that is used for non-VR downlink service feedback. Dashed lines in FIG. 4 represent scheduling periods. In this embodiment, that the first scheduling period, the second scheduling period, and the third scheduling period are consecutive scheduling periods, and sending the scheduling information and retransmitting the first data frame are in a same scheduling period are used as an example. A first data frame 411 in which an error occurs exists in the service data sent by the AP on the fixed RU 41 in the first scheduling period. In response to detecting the transmission error of the first data frame, the STA sends first feedback information 461 to the AP on the RU 46 in the second scheduling period. The AP sends scheduling information 421 to the STA on the fixed resource 42 in the third scheduling period. The AP sends the scheduling information for a plurality of times in the third scheduling period, and scheduling information 422 in the first scheduling period and the second scheduling period is a retransmission indication indicating the transmission error of the service data before the first scheduling period. After sending the scheduling information 421 in the third scheduling period, the AP sends a retransmitted first data frame 431 to the STA on the RU 43.

The retransmission resource unit is included in the first dynamic scheduling resource, and is used to carry a VR retransmission service. The first dynamic scheduling resource further carries feedback information of the non-VR downlink service and the non-VR uplink service. Optionally, RUs used for the feedback information of the non-VR downlink service and the non-VR uplink service are also indicated by the scheduling information.

The downlink channel performs VR service new transmission resource reservation and feedback resource reservation for the uplink channel based on a data volume of a VR service of each STA, and the first dynamic scheduling resource is used to preferentially schedule a high-priority service (for example, the VR retransmission service), to implement full-duplex transmission and symbol-level retransmission of the VR service. In this way, a high bandwidth and a low latency for the VR service are effectively ensured. In addition, full-duplex transmission is formed through dynamic scheduling of new transmission and feedback of non-VR service resources, which better meets bandwidth and latency usage of the non-VR service.

305: The STA sends an uplink service to the AP.

In the channel transmission opportunity, the STA further sends the uplink service to the AP. For example, the STA sends the uplink service to the AP in a fifth scheduling period. The uplink service includes a second data frame, and the second data frame is any data in the uplink service. The plurality of scheduling periods included in the channel transmission opportunity further include the fifth scheduling period.

306: The AP sends second feedback information to the STA.

In response to detecting the transmission error of the second data frame in the uplink service, the AP sends the second feedback information and second scheduling information to the STA on the first dynamic scheduling resource in a sixth scheduling period of the plurality of scheduling periods, so that the STA retransmits the second data frame on a retransmission resource indicated by the second scheduling information. The sixth scheduling period is a scheduling period after one or more scheduling periods followed by the fifth scheduling period.

Alternatively, step 305 and step 306 is performed before or at the same time as step 301 to step 304. This is not limited herein.

In at least one embodiment, in the channel transmission opportunity, in response to the error occurring in the service data sent by the AP to the STA, the AP receives the feedback information from the STA, sends the scheduling information to the STA, and sends the retransmitted data. In one downlink transmission opportunity allocated by the preamble, new transmission and corresponding retransmission of a service is completed. In this way, flexibility is higher, channel utilization is effectively improved, a large amount of burst service data is well adapted, sufficient channel resources are allocated in a timely manner, and transmission timeliness is improved.

Further, for the retransmission service and the non-VR service, the AP performs proper scheduling on the first dynamic scheduling resource, so that full-duplex transmission is performed on the non-VR service, and guarantee is provided for another service that exhibits a high latency.

The data transmission method is described above. The following describes communication apparatuses in at least one embodiment with reference to accompanying drawings.

Figure 5:
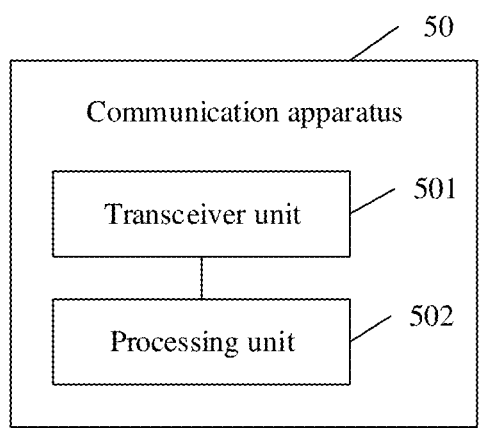
FIG. 5 is a schematic diagram of a structure of a communication apparatus according to at least one embodiment.

FIG. 5 is a schematic diagram of an embodiment of a communication apparatus 50 according to at least one embodiment.

As shown in FIG. 5, a structure of the communication apparatus 50 provided in at least one embodiment includes:
a transceiver unit 501, configured to: in one channel transmission opportunity, send service data to a station STA, where the service data includes a first data frame; receive first feedback information sent by the STA, where the first feedback information indicates to retransmit the first data frame; send scheduling information to the STA, where the scheduling information indicates a retransmission resource unit in which the retransmitted first data frame is located; and send the first data frame to the STA on the retransmission resource unit; and
a processing unit 502, configured to generate the scheduling Information.

Optionally, the transceiver unit 501 is specifically configured to:
send the service data to the STA in a first scheduling period, where the channel transmission opportunity includes a plurality of scheduling periods, and the plurality of scheduling periods include the first scheduling period;
receive, in a second scheduling period, the first feedback information sent by the STA, where the plurality of scheduling periods include the second scheduling period, and the second scheduling period is a scheduling period after the first scheduling period;
send the scheduling information to the STA in a third scheduling period, where the plurality of scheduling periods include the third scheduling period, and the third scheduling period is a scheduling period after the second scheduling period; and
send the first data frame to the STA on the retransmission resource unit and in a fourth scheduling period, where the plurality of scheduling periods include the fourth scheduling period, and the fourth scheduling period is the third scheduling period or a scheduling period after the third scheduling period.

The processing unit 502 is specifically configured to: generate the scheduling information in the second scheduling period or the third scheduling period.

Optionally, the transceiver unit 501 is specifically configured to send the scheduling information to the STA on a fixed resource, where the scheduling information includes a first special identifier, and the first special identifier indicates that the fixed resource is a preset fixed resource unit for transmitting the scheduling information.

Optionally, the retransmission resource unit is included in a first dynamic scheduling resource on a downlink channel, the scheduling information includes a second special identifier, and the second special identifier indicates that the first dynamic scheduling resource is a preset resource unit for adjusting resource allocation.

Optionally, the retransmission resource unit is used to carry a virtual reality VR retransmission service, and the first dynamic scheduling resource is used to carry feedback information of the VR retransmission service, a non-VR downlink service, and a non-VR uplink service. The VR retransmission service takes precedence over the non-VR downlink service and the non-VR uplink service in terms of transmission of the feedback information.

Optionally, the feedback information is carried on a second dynamic scheduling resource on an uplink channel, the second dynamic scheduling resource is used for dynamic scheduling of uplink transmission of a non-virtual-reality VR service and downlink feedback of the non-VR service, and dynamic scheduling of the second dynamic scheduling resource is controlled based on the scheduling information.

Optionally, the transceiver unit 501 is specifically configured to send the scheduling information to the STA for a plurality of times in the third scheduling period.

Optionally, the transceiver unit 501 is further configured to: receive an uplink service sent by the STA, where the uplink service includes a second data frame; and
send second feedback information to the STA, where the second feedback information indicates the STA to retransmit the second data frame.

The processing unit 502 is further configured to: determine the second feedback information.

Figure 6:
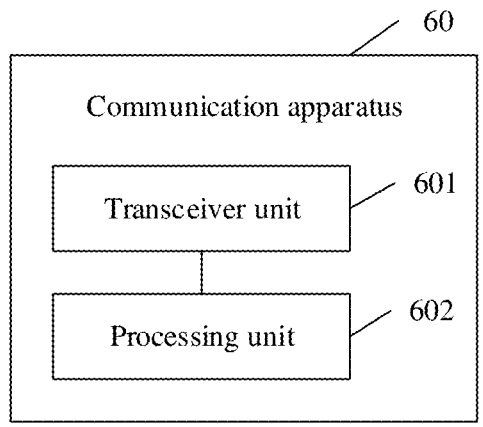
FIG. 6 is a schematic diagram of another structure of a communication apparatus according to at least one embodiment.

FIG. 6 is a schematic diagram of a communication apparatus 60 according to at least one embodiment.

As shown in FIG. 6, another structure of the communication apparatus 60 provided in at least one embodiment includes:
a transceiver unit 601, configured to: in one channel transmission opportunity, receive service data sent by an access point AP, where the service data includes a first data frame; send first feedback information to the AP, where the feedback information indicates the AP to retransmit the first data frame; receive scheduling information sent by the AP, where the scheduling information indicates a retransmission resource unit in which the retransmitted first data frame is located; and receive the first data frame on the retransmission resource unit; and
a processing unit 602, configured to determine the feedback information.

Optionally, the transceiver unit 601 is specifically configured to:
receive, in a first scheduling period, the service data sent by the AP, where the channel transmission opportunity includes a plurality of scheduling periods, and the plurality of scheduling periods include the first scheduling period;
send, by a STA, the feedback information to the AP in a second scheduling period, where the plurality of scheduling periods include the second scheduling period, and the second scheduling period is a scheduling period after the first scheduling period;
receive, in a third scheduling period, the scheduling information sent by the AP, where the plurality of scheduling periods include the third scheduling period, and the third scheduling period is a scheduling period after the second scheduling period; and
receive the first data frame on the retransmission resource unit and in a fourth scheduling period, where the plurality of scheduling periods include the fourth scheduling period, and the fourth scheduling period is the third scheduling period or a scheduling period after the third scheduling period.

The processing unit 602 is specifically configured to: determine the first feedback information in the first scheduling period or the second scheduling period.

Optionally, the transceiver unit 601 is further configured to: send an uplink service to the AP, where the uplink service includes a second data frame; and
receive second feedback information sent by the AP, where the second feedback information indicates to retransmit the second data frame.

Figure 7:
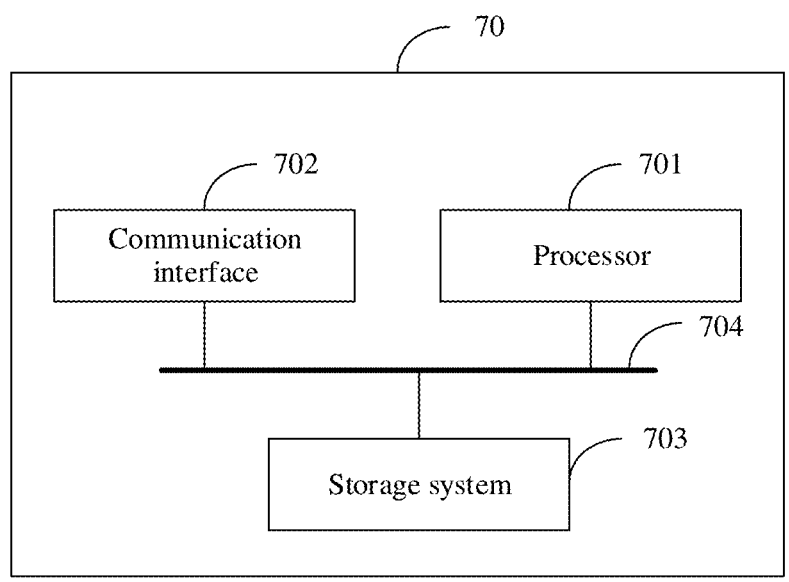
FIG. 7 is a schematic diagram of a structure of a computer device according to at least one embodiment.

FIG. 7 is a schematic diagram of a possible logical structure of a computer device 70 according to at least one embodiment. The computer device 70 includes a processor 701, a communication interface 702, a storage system 703, and a bus 704. The processor 701, the communication interface 702, and the storage system 703 are connected to each other through the bus 704. In at least one embodiment, the processor 701 is configured to control and manage an action of the computer device 70. For example, the processor 701 is configured to perform the steps performed by the AP or the STA in the method embodiment in FIG. 3. The communication interface 702 is configured to support the computer device 70 in performing communication. The storage system 703 is configured to store program code and data of the computer device 70.

The processor 701 is a central processing unit, a general-purpose processor, a digital signal processor, an application-specific integrated circuit, a field programmable gate array or another programmable logical device, a transistor logical device, a hardware component, or any combination thereof. The processor implements or execute various example logical blocks, modules, and circuits described with reference to content disclosed in at least one embodiment. Alternatively, the processor 701 is a combination of processors that implement a computing function, for example, a combination that includes one or more microprocessors, or a combination of a digital signal processor and a microprocessor. The bus 704 is a peripheral component interconnect (Peripheral Component Interconnect, PCI) bus, an extended industry standard architecture (Extended Industry Standard Architecture, EISA) bus, or the like. Buses is classified into an address bus, a data bus, a control bus, and the like. For ease of representation, only one bold line is used to represent the bus in FIG. 7, but this does not mean that there is only one bus or only one type of bus.

The transceiver unit 501 in the communication apparatus 50 is equivalent to the communication interface 702 in the computer device 70. The processing unit 502 in the communication apparatus 50 is equivalent to the processor 701 in the computer device 70.

The transceiver unit 601 in the communication apparatus 60 is equivalent to the communication interface 702 in the computer device 70. The processing unit 602 in the communication apparatus 60 is equivalent to the processor 701 in the computer device 70.

In at least one embodiment, a computer-readable storage medium is further provided. The computer-readable storage medium stores computer-executable instructions. In response to a processor of a device executing the computer-executable instructions, the device performs the steps performed by the AP or the STA in the data transmission method in FIG. 3.

In at least one embodiment, a computer program product is further provided. The computer program product includes computer-executable instructions, and the computer-executable instructions are stored in a computer-readable storage medium. In response to a processor of a device executing the computer-executable instructions, the device performs the steps performed by the AP or the STA in the data transmission method in FIG. 3

A person skilled in the art understands that, for the purpose of convenient and brief description, for a detailed working process of the foregoing system, apparatus, and unit, refer to a corresponding process in the foregoing method embodiments, and details are not described herein again.

In at least one embodiment, the disclosed system, apparatus, and method is implemented in other manners. For example, the described apparatus embodiment is merely an example. For example, division into the units is merely logical function division and is other division in actual implementation. For example, a plurality of units or components is combined or integrated into another system, or some features is ignored or not performed. In addition, the displayed or discussed mutual couplings or direct couplings or communication connections is implemented through some interfaces. The indirect couplings or the communication connections between the apparatuses or units is implemented in electronic, mechanical, or other forms.

The units described as separate parts may or may not be physically separate, and parts displayed as units may or may not be physical units, is located in one position, or is distributed on a plurality of network units. Some or all of the units is selected based on actual usage to achieve the objectives of the solutions of embodiments.

In addition, functional units in at least one embodiment is integrated into one processing unit, each of the units exist independently physically, or two or more units is integrated into one unit. The integrated unit is implemented in a form of hardware, or is implemented in a form of a software functional unit.

In response to the integrated unit being implemented in the form of the software functional unit and sold or used as an independent product, the integrated unit is stored in a computer-readable storage medium. Based on such an understanding, the technical solutions of at least one embodiment essentially, or the part contributing to the conventional technology, or all or some of the technical solutions is implemented in the form of a software product. The computer software product is stored in a storage medium and includes several instructions for instructing a computer device (which is a personal computer, a server, or a network device) to perform all or some of the steps of the methods described in at least one embodiment. The foregoing storage medium includes any medium that stores program code, such as a USB flash drive, a removable hard disk, a read-only memory (ROM, read-only memory), a random access memory (RAM, random access memory), a magnetic disk, or an optical disc.

What is claimed is:

1. A data transmission method, applied to a wireless local area network and comprising: in one channel transmission opportunity,
    sending, by an access point AP, service data to a station STA, wherein the service data includes a first data frame;
    receiving, by the AP, first feedback information from the STA, wherein the first feedback information indicates to retransmit the first data frame;
    sending, by the AP, scheduling information to the STA, wherein the scheduling information indicates a retransmission resource unit in which the retransmitted first data frame is located; and
    sending, by the AP, the first data frame to the STA on the retransmission resource unit.

2. The data transmission method according to claim 1, wherein the sending, by an AP, service data to a STA includes:
    sending, by the AP, the service data to the STA in a first scheduling period, wherein the channel transmission opportunity includes a plurality of scheduling periods, and the plurality of scheduling periods includes the first scheduling period;
    the receiving, by the AP, first feedback information from the STA includes:
    receiving, by the AP, the first feedback information from the STA in a second scheduling period, wherein the plurality of scheduling periods includes the second scheduling period, and the second scheduling period is a scheduling period after the first scheduling period;
    the sending, by the AP, scheduling information to the STA includes:
    sending, by the AP, the scheduling information to the STA in a third scheduling period, wherein the plurality of scheduling periods includes the third scheduling period, and the third scheduling period is a scheduling period after the second scheduling period; and
    the sending, by the AP, the first data frame to the STA on the retransmission resource unit includes:
    sending, by the AP, the first data frame to the STA on the retransmission resource unit and in a fourth scheduling period, wherein the plurality of scheduling periods includes the fourth scheduling period, and the fourth scheduling period is the third scheduling period or a scheduling period after the third scheduling period.

3. The data transmission method according to claim 1, wherein the sending, by the AP, scheduling information to the STA includes:
    sending, by the AP, the scheduling information to the STA on a fixed resource, wherein the scheduling information includes a first special identifier, and the first special identifier indicates that the fixed resource is a preset fixed resource unit for transmitting the scheduling information.

4. The data transmission method according to claim 1, wherein the retransmission resource unit includes in a first dynamic scheduling resource on a downlink channel, the scheduling information includes a second special identifier, and the second special identifier indicates that the first dynamic scheduling resource is a preset resource unit for adjusting resource allocation.

5. The data transmission method according to claim 4, wherein the retransmission resource unit carries a virtual reality VR retransmission service, the first dynamic scheduling resource carries feedback information of the VR retransmission service, a non-VR downlink service, and a non-VR uplink service, and the VR retransmission service takes precedence over the non-VR downlink service and the non-VR uplink service in terms of transmission of the feedback information.

6. The data transmission method according to claim 1, wherein the feedback information is carried on a second dynamic scheduling resource on an uplink channel, the second dynamic scheduling resource provides dynamic scheduling of uplink transmission of a non-virtual-reality VR service and downlink feedback of the non-VR service, and dynamic scheduling of the second dynamic scheduling resource is controlled based on the scheduling information.

7. The data transmission method according to claim 2, wherein the sending, by the AP, the scheduling information to the STA in a third scheduling period includes:
sending, by the AP, the scheduling information to the STA for a plurality of times in the third scheduling period.

8. The data transmission method according to claim 1, further comprising:
receiving, by the AP, an uplink service from the STA, wherein the uplink service includes a second data frame; and
sending, by the AP, second feedback information to the STA, wherein the second feedback information indicates the STA to retransmit the second data frame.

9. A data transmission method, applied to a wireless local area network and comprising: in one channel transmission opportunity,
receiving, by a station STA, service data from an access point AP, wherein the service data includes a first data frame;
sending, by the STA, first feedback information to the AP, wherein the first feedback information indicates the AP to retransmit the first data frame;
receiving, by the STA, scheduling information from the AP, wherein the scheduling information indicates a retransmission resource unit in which the retransmitted first data frame is located; and
receiving, by the STA, the first data frame on the retransmission resource unit.

10. The data transmission method according to claim 9, wherein the receiving, by a STA, service data sent by an AP includes:
receiving, by the STA in a first scheduling period, the service data from the AP, wherein the channel transmission opportunity includes a plurality of scheduling periods, and the plurality of scheduling periods includes the first scheduling period;
the sending, by the STA, first feedback information to the AP includes:
sending, by the STA, the first feedback information to the AP in a second scheduling period, wherein the plurality of scheduling periods includes the second scheduling period, and the second scheduling period is a scheduling period after the first scheduling period;
the receiving, by the STA, scheduling information from the AP includes:
receiving, by the STA in a third scheduling period, the scheduling information from the AP, wherein the plurality of scheduling periods includes the third scheduling period, and the third scheduling period is a scheduling period after the second scheduling period; and
the receiving, by the STA, the first data frame on the retransmission resource unit includes:
receiving, by the STA, the first data frame on the retransmission resource unit and in a fourth scheduling period, wherein the plurality of scheduling periods includes the fourth scheduling period, and the fourth scheduling period is the third scheduling period or a scheduling period after the third scheduling period.

11. The data transmission method according to claim 9, wherein the method further comprises:
sending, by the STA, an uplink service to the AP, wherein the uplink service includes a second data frame; and
receiving, by the STA, second feedback information from the AP, wherein the second feedback information indicates to retransmit the second data frame.

12. A communication apparatus, comprising:
a transceiver unit, configured to: in one channel transmission opportunity, receive service data sent by an access point AP, wherein the service data includes a first data frame; send first feedback information to the AP, wherein the feedback information indicates the AP to retransmit the first data frame; receive scheduling information from the AP, wherein the scheduling information indicates a retransmission resource unit in which the retransmitted first data frame is located; and receive the first data frame on the retransmission resource unit; and
a processing unit, configured to determine the feedback information.

13. The communication apparatus according to claim 12, wherein the transceiver unit is specifically configured to:
receive, in a first scheduling period, the service data from the AP, wherein the channel transmission opportunity includes a plurality of scheduling periods, and the plurality of scheduling periods includes the first scheduling period;
send, the first feedback information to the AP in a second scheduling period, wherein the plurality of scheduling periods includes the second scheduling period, and the second scheduling period is a scheduling period after the first scheduling period;
receive, in a third scheduling period, the scheduling information from the AP, wherein the plurality of scheduling periods includes the third scheduling period, and the third scheduling period is a scheduling period after the second scheduling period; and
receive the first data frame on the retransmission resource unit and in a fourth scheduling period, wherein the plurality of scheduling periods includes the fourth scheduling period, and the fourth scheduling period is the third scheduling period or a scheduling period after the third scheduling period; and
the processing unit is specifically configured to:
determine the first feedback information in the first scheduling period or the second scheduling period.

14. The communication apparatus according to claim 12, wherein the transceiver unit is further configured to:
send an uplink service to the AP, wherein the uplink service includes a second data frame; and
receive second feedback information from the AP, wherein the second feedback information indicates to retransmit the second data frame.

* * * * *